United States Patent [19]
Ichiki et al.

[11] Patent Number: 5,244,440
[45] Date of Patent: Sep. 14, 1993

[54] DIFFERENTIAL WITH OUTWARDLY DIRECTED PLANETARY GEAR SEPARATING FORCES

[75] Inventors: Shiro Ichiki, Rochester; Thomas B. Ryan, Webster, both of N.Y.

[73] Assignee: Zexel-Gleason USA, Inc., Rochester, N.Y.

[21] Appl. No.: 969,727

[22] Filed: Oct. 30, 1992

[51] Int. Cl.$^5$ ............................................. F16H 1/42
[52] U.S. Cl. ................................................. 475/252
[58] Field of Search ...................................... 475/252

[56] References Cited

U.S. PATENT DOCUMENTS

| | | | |
|---|---|---|---|
| 1,108,800 | 8/1914 | Shrader | 475/252 X |
| 2,269,734 | 1/1942 | Powell | 475/252 |
| 3,292,456 | 12/1966 | Saari | 475/252 |
| 3,706,239 | 12/1972 | Myers | 475/252 |
| 3,738,192 | 6/1973 | Belansky | 475/252 |
| 4,365,524 | 12/1982 | Dissett et al. | 475/252 |
| 4,762,023 | 8/1988 | Ivy | 475/252 X |
| 5,083,987 | 1/1992 | Körner et al. | 475/252 X |
| 5,122,101 | 6/1992 | Tseng | 475/252 |
| 5,194,054 | 3/1993 | Ambron et al. | 475/252 X |

OTHER PUBLICATIONS

"Gear Reactions and Mountings" (Chapter 12) in Gear Handbook, Darle W. Dudley, Ed., McGraw-Hill, 1962, pp. 12-1 through 12-19.

Primary Examiner—Dirk Wright
Attorney, Agent, or Firm—Eugene Stephens & Associates

[57] ABSTRACT

A parallel-axis gear differential (10) includes a planetary gearing assembly of sun gears (22 and 24) and planet gears (26, 28, 30, 32, 34, and 36) carried within a housing (12). The planet gears (26, 28, 30, 32, 34, and 36), which are mounted in pairs within pockets (38, 40, 42, 44, 46, and 48) formed in the housing (12), include a first point of meshing engagement (74, 76) with one of the side gears (22, 24) and second and third points of meshing engagement (78 and 80) with a paired planet gear. A radial load component "Ws1" at the first point of engagement (74, 76) is adjusted with respect to a combined radial load component "Ws2" of the second and third points of engagement (78 and 80) for maintaining the planet gears (26, 28, 30, 32, 34, and 36) in their proper running positions within pockets (38, 40, 42, 44, 46, and 48).

17 Claims, 4 Drawing Sheets

5,244,440

DIFFERENTIAL WITH OUTWARDLY DIRECTED PLANETARY GEAR SEPARATING FORCES

TECHNICAL FIELD

The invention relates to the field of differentials having planetary gear sets for interconnecting a pair of output shafts.

BACKGROUND

Gear differentials include compound planetary gear sets carried within a housing for interconnecting a pair of output shafts. The planetary gear sets permit the output shafts to rotate in opposite directions with respect to the housing. An input shaft is operatively connected to the housing for rotating the housing about a common axis of the output shafts.

Sun gear members of the planetary gear sets, also referred to as "side" gears, are coupled to inner ends of the output shafts. Planet gear members of the same sets, also referred to as "element" gears, operatively connect the side gears for relative rotation in opposite directions. The sun gear members rotate together with the output shafts about the common axis of the output shafts. However, the planet gears rotate about axes that can be variously offset and inclined with respect to the common axis.

One known type of gear differential, referred to as a "parallel-axis" gear differential, includes the sun and planet gears mounted about axes that extend parallel to each other. The planet gears of this type of differential are generally mounted in pairs within the housing. One portion of each planet gear meshes with one of the side gears, and another portion of each planet gear meshes with its paired planet gear.

The planet gears are individually supported for rotation on shafts or within pockets formed in the housing. The shafts are journalled in bores formed in the housing at opposite ends of the planet gears. The pockets provide bearings for slidably supporting outside cylindrical surfaces of the planet gears formed by top lands of the planet gear teeth.

One example of a parallel-axis gear differential having planet gears individually supported within housing pockets is disclosed in U.S. Pat. No. 3,706,239 (MYERS). The pockets, together with other gear mounting surfaces in the differential of Myers, provide frictional surfaces for opposing relative rotation (i.e., differentiation) of the planet gear set. The amount of friction is proportional to the total drive torque transmitted by the differential housing, and the friction is used to support torque differences between the output shafts.

Differentials that develop a frictional resistance to differentiation proportional to drive torque (like the one disclosed in Myers) are referred to as "torque proportioning" differentials. The frictional resistance helps to compensate for an uneven traction condition presented to a pair of drive wheels by delivering more drive torque to the wheel with better traction. In turns, more drive torque is delivered to the slower rotating drive wheel.

Gear tooth forces acting at two different locations on the planet gears in Myers tend to misalign or tilt the planet gears within their pockets. Although some misalignment of the planet gears can be used to generate increased frictional resistance to differentiation, a spacer is required to provide additional radial support for the planet gears. The spacer includes arcuate segments for enclosing openings in the pockets between the side gears.

Another example of a parallel-axis gear differential having planet gears mounted within housing pockets is disclosed in U.S. Pat. No. 5,122,101 (TSENG), a patent commonly assigned herewith. The planet gears are formed as so-called "combination" gears having two gear sections separated by a stem. A first of the gear sections of each combination gear includes respective points of mesh with one of the side gears and with a second of the gear sections of a paired combination gear. The second section of each combination gear includes a point of mesh with the first portion of its paired combination gear. The two points of mesh between paired combination gears straddle points of mesh between the paired combination gears and the side gears along the common axis of the side gears.

Although the two points of mesh between paired combination gears reduce the tendency of the combination gears to tilt within their pockets, movement of the combination gears toward the common axis can produce interference with teeth of the side gears. The interference can be caused by either angular or rectilinear gear movements that reduce backlash between the combination gears and the side gears. The loss of backlash can cause the mating gear teeth of the gears to bind together, thereby increasing gear tooth wear and possibilities for gear tooth failure and producing inconsistent differential performance.

SUMMARY OF INVENTION

The invention involves improvements to parallel-axis gear differentials having planet gears mounted within housing pockets. The differentials are configured similar to the differentials disclosed in U.S. Pat. No. 5,122,101 (TSENG), and particular relationships are observed in the design and dimensioning of the gearing to resist potentially damaging movements of the gears out of their desired running positions.

One example of the improved differential includes a housing that is rotatable by drive torque about a common axis of a pair of output shafts. A pair of side gears is positioned in the housing for rotation with the output shafts about the common axis. One or more pairs of combination gears are positioned within the housing forming separate gear trains for operatively connecting the side gears. An equal number of pairs of pockets are formed in the housing supporting the pairs of combination gears for rotation about respective axes that extend parallel to the common axis.

Each combination gear has a first point of meshing engagement with one of the side gears and second and third points of meshing engagement with its paired combination gear. The second point of meshing engagement is located at a first distance "a" along the common axis from the first point of meshing engagement, and the third point of meshing engagement is located at a second distance "b" in an opposite direction along the common axis from the first point of meshing engagement. The first distance "a" is no larger than the second distance "b".

A first radial load transmitted by the first point of meshing engagement includes a component "$W_{s1}$" along a line of centers between the common axis and the axis of the combination gear in mesh at the first point of meshing engagement. A second radial load divided between the second and third points of meshing engagement includes a component "$W_{s2}$" in an opposite direction along the line of centers. The potentially damaging movements of the combination gears are resisted by relating the components "$W_{s1}$" and "$W_{s2}$" of the first and second radial loads according to the following inequality:

$$2a\ W_{s1} \geq (a+b)W_{s2}$$

The two force components "$W_{s1}$" and "$W_{s2}$" are functions of a transverse pressure angle "$phi_t$" between mating gear tooth surfaces at the three points of meshing engagement. A transverse pressure angle "$phi_t$" of sufficient magnitude to satisfy the above relationship between force components "$W_{s1}$" and "$W_{s2}$" is given by the following inequality:

$$\text{TAN}(phi_t) \geq \frac{\text{COS(theta)}}{\frac{2a}{(a+b)} + \text{SIN(theta)}}$$

where "theta" is defined as an angle formed between the line of centers and a radial line extending perpendicular to the common axis through the second and third points of meshing engagement projected into a transverse plane of the side and combination gears.

DRAWINGS

DETAILED DESCRIPTION

Figure 1:
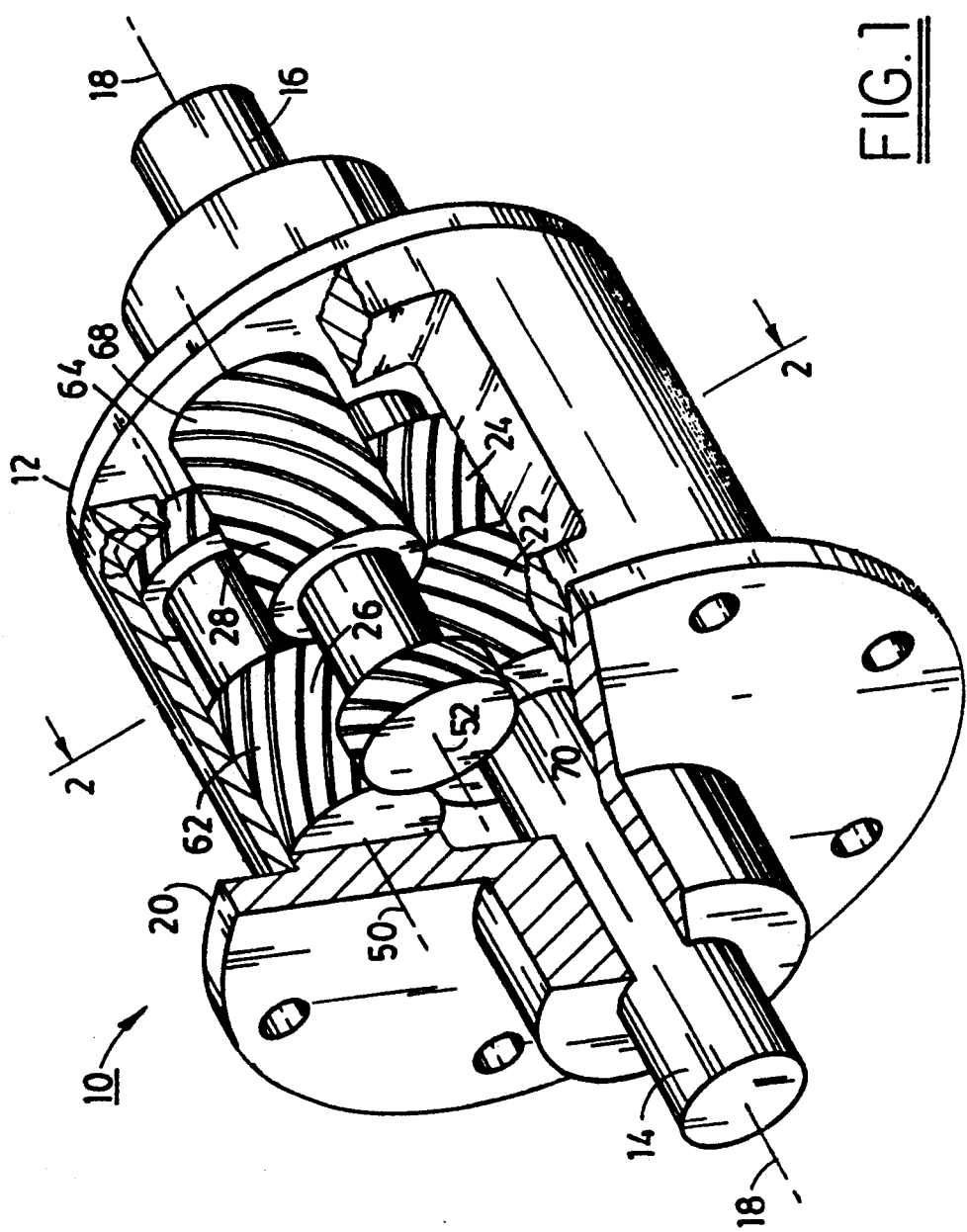
FIG. 1 is perspective view of the type of differential treated by the invention with portions of a housing removed to reveal planetary gearing.
Figure 2:
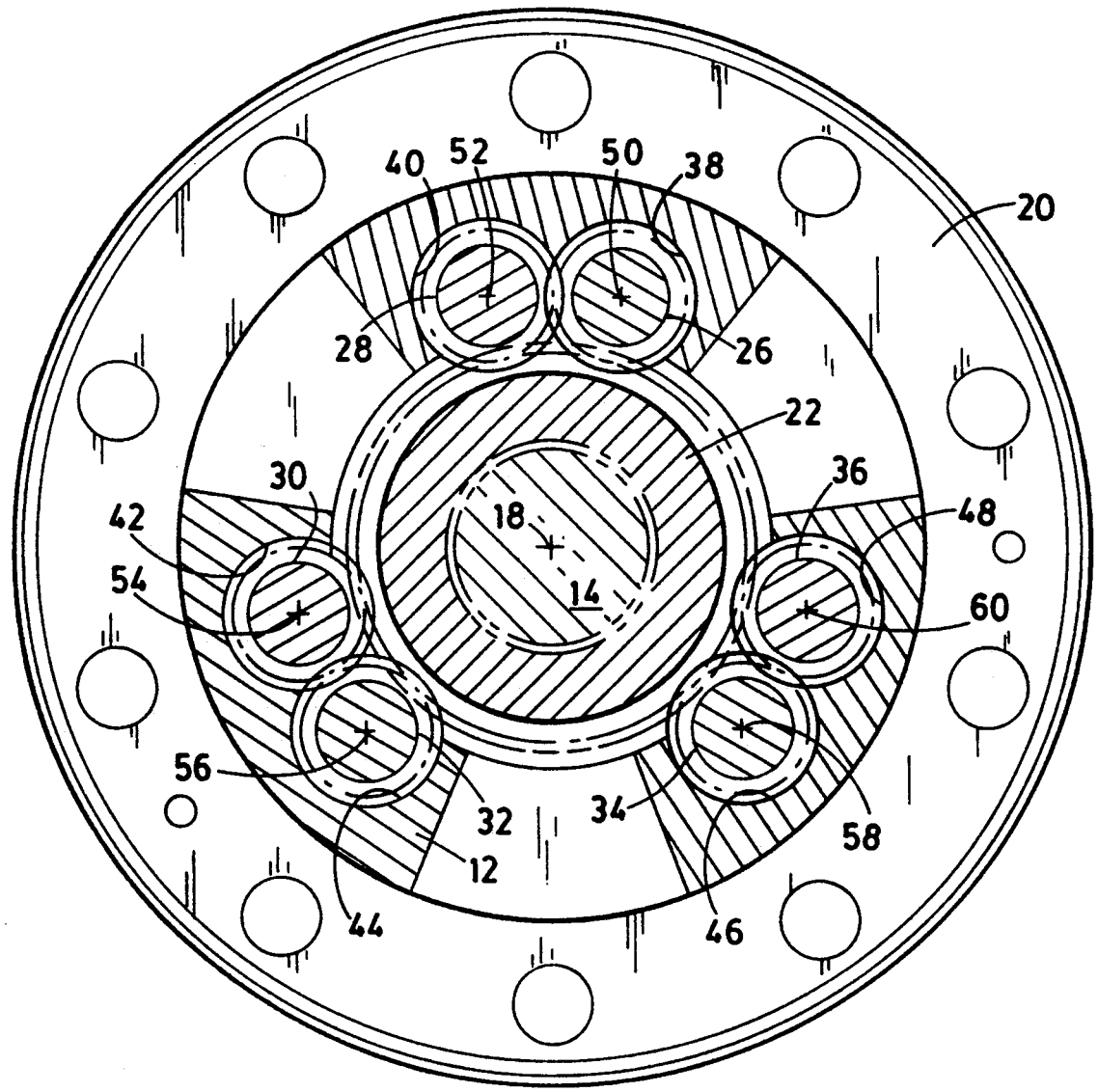
FIG. 2 is a cross-sectional view of the differential in FIG. 1 taken along line 2—2.

Illustrated by FIGS. 1 and 2 is a parallel-axis gear differential 10 similar to the differential disclosed in commonly assigned U.S. Pat. No. 5,122,101. The disclosure of this commonly assigned patent is hereby incorporated by reference. The differential 10 has a housing 12 that receives and supports the ends of two output shafts 14 and 16 for rotation about a common axis 18. A flange 20, formed integrally with the housing 12, is adapted to receive a ring gear (not shown) for transmitting drive power to the housing 12.

Coupled to the ends of the output shafts 14 and 16 are side gears 22 and 24 that function as sun gears within a planetary gear arrangement. Three pairs of combination gears 26 and 28, 30 and 32, and 34 and 36, which function as planet gear pairs, are positioned within the housing 12 forming separate gear trains for rotating the side gears 22 and 24 in opposite directions about the common axis 18. Although the illustrated differential 10 includes three pairs of combination gears, more or fewer pairs of combination gears can be used to provide a similar connection between the side gears.

The individual combination gears 26, 28, 30, 32, 34, and 36 are mounted for rotation within respective pockets 38, 40, 42, 44, 46, and 48 that form bearing surfaces within the housing 12 for supporting outside cylinder surfaces of the combination gears. The pockets 38, 40, 42, 44, 46, and 48 are positioned within the housing 12 for supporting rotations of the combination gears 26, 28, 30, 32, 34, and 36 about respective axes 50, 52, 54, 56, 58, and 60 that extend parallel to the common axis 18.

The combination gears 26, 30, and 34 mesh with the side gear 22; and the combination gears 28, 32, and 36 mesh with the side gear 24. The combination gears 26 and 28 of a first pair, the combination gears 30 and 32 of a second pair, and the combination gears 34 and 36 of a third pair also mesh with each other at two different locations. The meshing relationships of the combination gears 26 and 28 comprising one of the gear trains interconnecting the side gears 22 and 24 are illustrated by FIG. 3 in which, for purposes of simplification, the gear train has been unwrapped to show all of the gear axes 18, 50, and 52 in a single plane, the common axis 18 being split as indicated.

Each of the combination gears 26 and 28 includes two gear sections separated by a stem section. For example, the combination gear 26 includes: a first gear section 62 in mesh with both the side gear 22 and a second gear section 70 of its paired combination gear 28, a second gear section 64 in mesh with a first gear section 68 of its paired combination gear 28, and a stem section 66 for providing clearance with the side gear 24. The first gear section 68 of the combination gear 28 also meshes with the side gear 24, and a stem section 72 of the same combination gear provides clearance with the side gear 22.

Each of the combination gears 26 and 28 also includes three points of meshing engagement (i.e., points of contact). For example, the combination gears 26 and 28 have respective first points of meshing engagement 74 and 76 with the side gears 22 and 24 and have respective second and third points of meshing engagement 78 and 80 with each other. The first points of meshing engagement 74 and 76 are located midway of the side gear face widths. The second and third points of meshing engagement 78 and 80 are located midway of the second gear section face widths.

Figure 3:
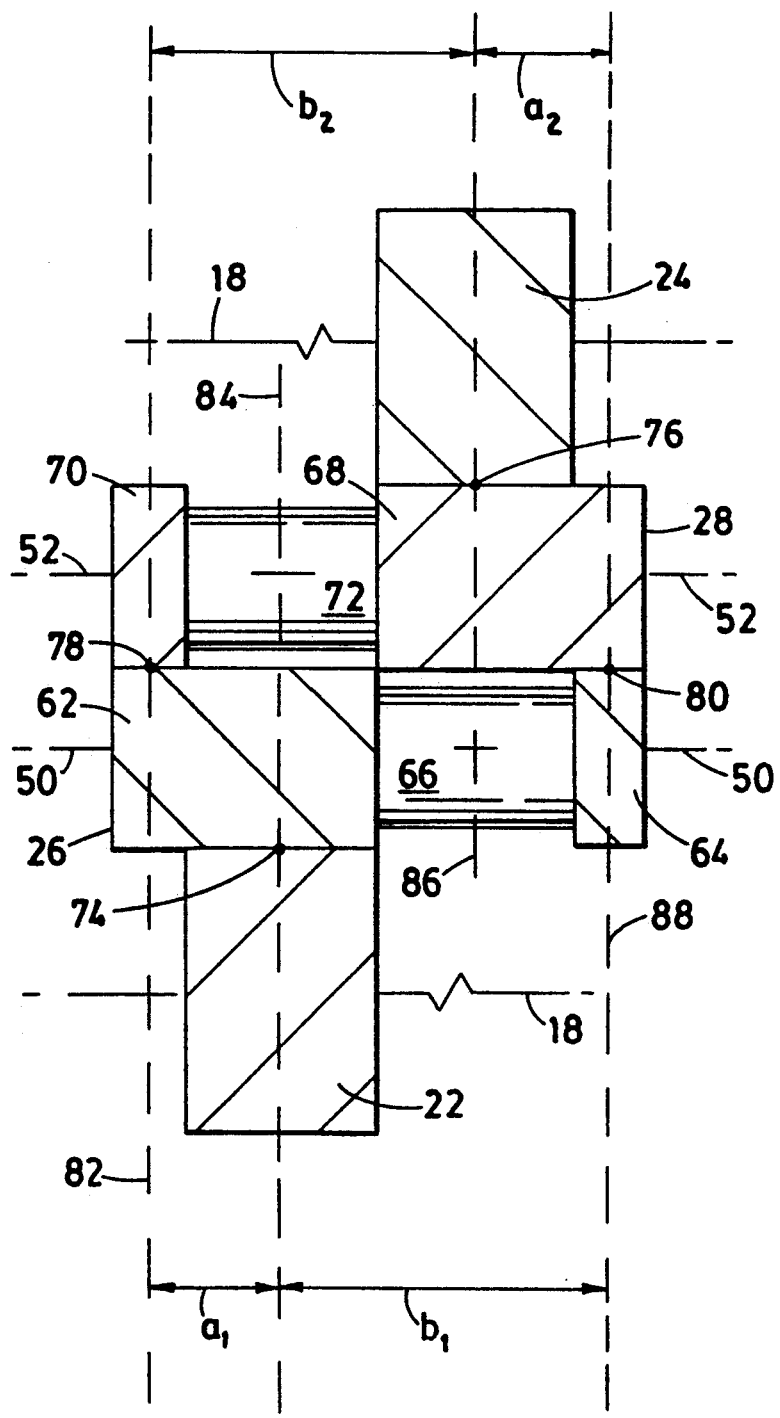
FIG. 3 is a diagrammatic representation of the planetary gearing shown in FIG. 1 with the individual gears rotated from the mounting positions into a common axial plane.

Transverse planes 82, 84, 86, and 88 appear on edge in FIG. 3 intersecting the respective points of meshing engagement 78, 74, 76, and 80. The second and third points of meshing engagement 78 and 80 are located at respective distances "$a_1$" and "$b_1$" along the common axis 18 from the first point of meshing engagement 74 and at respective distances "$b_2$" and "$a_2$" along the common axis 18 from the other first point of meshing engagement 76. For sake of simplicity, the distances "$a_1$" and "$a_2$" or an average of these distances can be considered equal to a distance "a." Similarly, the distances "$b_1$" and "$b_2$" or an average of these distances can be considered equal to a distance "b."

Figure 4:
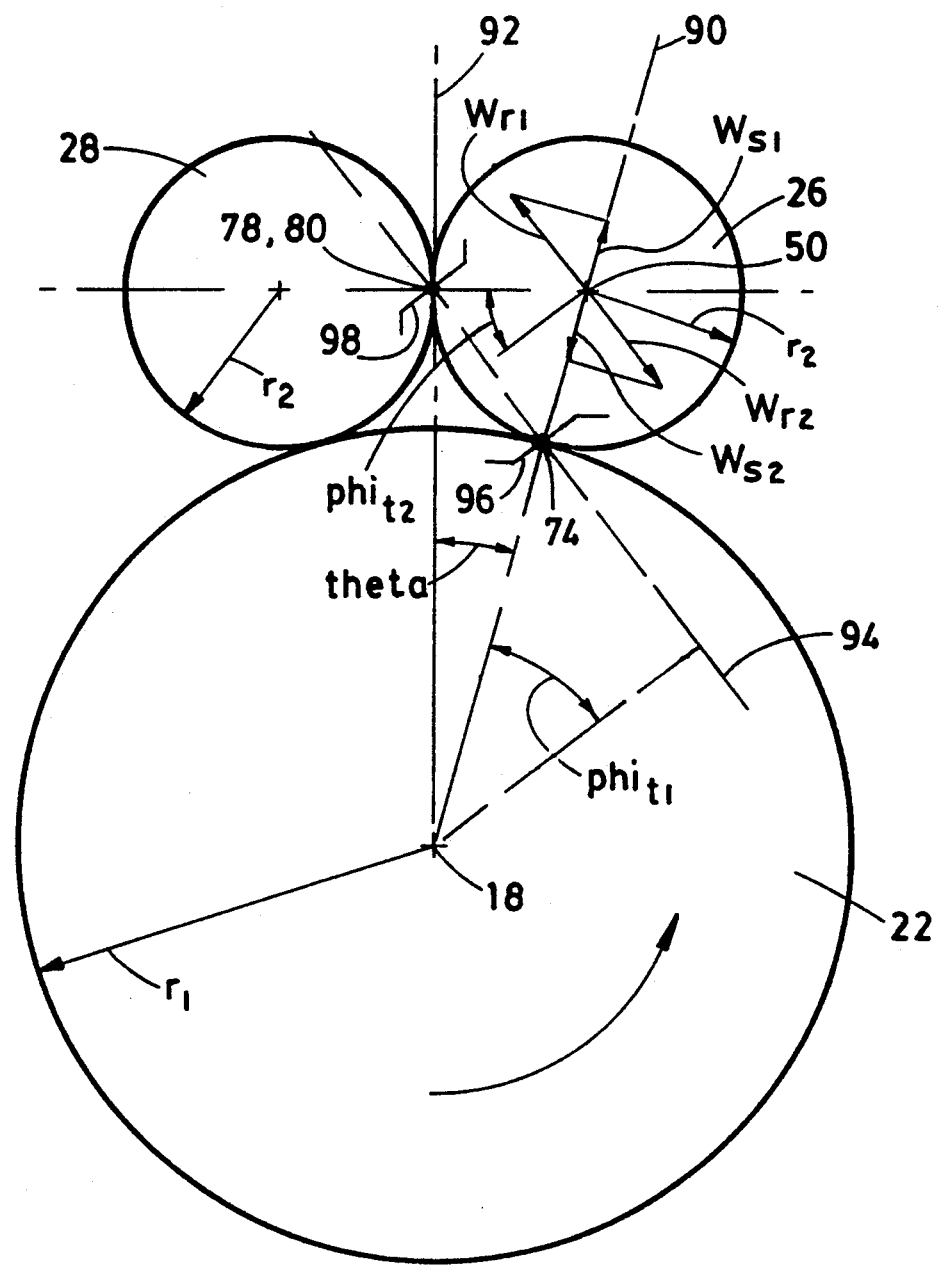
FIG. 4 is an enlarged diagrammatic representation of the same planetary gears as they would appear in their correct mounting positions viewed in a transverse plane similar to FIG. 2.

FIG. 4 depicts the side gear 24 and the two combination gears 26 and 28 as their equivalent pitch circles having respective radii "$r_1$" and "$r_2$", the pitch radii "$r_2$" of the combination gears being equal. A line of centers 78 passes through the common axis 18 and the axis 50 of the combination gear 26. A radial line 92 extends from the common axis 18 through the second and third points of meshing engagement 78 and 80, which are projected as a common pitch point into the transverse drawing plane. An angle "theta" is defined between the line of centers 90 and the radial line 92 and can be calculated as follows:

$$\text{SIN(theta)} = \frac{r_2}{r_1 + r_2}$$

For simplicity of illustration, a single line of action 94 is drawn through the first point of meshing engagement 74 (which is also projected as a pitch point) and the second and third points of meshing engagement 78 and 80. However, the inclinations of the mating tooth surfaces 96 and 98 to their respective tangent planes are referenced by different transverse pressure angles "phi$_{t1}$" and "phi$_{t2}$".

Gear tooth loads communicated between the mating tooth surfaces 96 and 98 produce radial loads "$W_{r1}$" and "$W_{r2}$" acting on the combination gear 26. The two radial loads "$W_{r1}$" and "$W_{r2}$" are referenced at the axis 50 of the combination gear 26 and are directed in opposite directions along the line of action 94. The radial load "$W_{r1}$" has a component "$W_{s1}$" along the line of centers 90, and this component "$W_{s1}$" is determined as a function of the transverse pressure angle "phi$_{t1}$" as follows:

$$W_{s1} = W_{r1} \, \text{SIN}(phi_{t1})$$

The radial load "$W_{r2}$" can also be considered as having a component "$W_{s2}$" along the same line of centers 90. However, the component "$W_{s2}$" is determined as a function of both the transverse pressure angle "phi$_{t2}$" and the angle "theta" as follows:

$$W_{s2} = W_{r2} \, \text{COS}(phi_{t2} + theta)$$

Preferably, the component "$W_{s1}$" is larger than the component "$W_{s2}$" so that the total load acting along the line of centers 90 urges the combination gear 26 away from the side gear 22 into engagement with its pocket 38. However, magnitudes of the component "$W_{s1}$" just larger than magnitudes of the component "$W_{s2}$" are not necessarily sufficient to prevent tipping of the combination gear 26 about an axis that is perpendicular to both the common axis 18 and the line of centers 90.

Since the combination gears 26 and 28 have two points of meshing engagement 78 and 80, the component "$W_{s2}$" is divided between the two points of mesh within the respective transverse planes 82 and 88 shown in FIG. 3. Although different divisions of force are possible, the component "$W_{s2}$" is expected, on average, to be divided equally between the two transverse planes 82 and 88. The equal division of component "$W_{s2}$" at the point of mesh 80 exerts a moment "$M_{ab}$" on the combination gear 26 at the point of mesh 78 equal to the following product with the distances "a" and "b":

$$M_{ab} = \frac{(a+b) W_{s2}}{2}$$

However, the component "$W_{s1}$" is effective for opposing the moment "$M_{ab}$" over a shorter distance "a." An opposing moment "$M_a$" is determined by the following equation:

$$M_a = a \, W_{s1}$$

Accordingly, to resist tipping of the combination gear 26 about an axis that is perpendicular to both the common axis 18 and the line of centers 90, the magnitude of the moment "$M_a$" should be not less than the magnitude of the moment "$M_{ab}$", a relationship that can otherwise be expressed by the following inequality:

$$2a \, W_{s1} \geq (a+b) W_{s2}$$

Neglecting friction acting on the combination gear 26, a transverse pressure angle "phi$_{t1}$" and "phi$_{t2}$", can be determined in accordance with the following inequality:

$$\text{TAN}(phi_t) \geq \frac{\text{COS(theta)}}{\frac{2a}{(a+b)} + \text{SIN(theta)}}$$

A minimum value for the transverse pressure angle "phi$_t$", when distances "a" and "b" are equal, can be determined as follows:

$$\text{TAN}(phi_t) \geq \frac{\text{COS(theta)}}{1 + \text{SIN(theta)}}$$

The above-described relationships relating to the practice of the invention provide a general guide for resisting potentially damaging movements of the combination gears out of their desired running positions within their pockets. However, those of skill in the art will appreciate that other factors including friction may affect the running positions of the combination gears, and the above relationships may be further developed to account for these factors.

We claim:

1. A differential assembly comprising:
   a housing rotatable by drive torque about a common axis of a pair of output shafts;
   a pair of side gears positioned within said housing for rotation with said output shafts about said common axis;
   at least one pair of combination gears positioned within said housing for operatively connecting said side gears;
   at least one pair of pockets formed in said housing supporting said pair of combination gears for rotation about respective axes that extend parallel to said common axis;
   one of said combination gears having a first point of meshing engagement with one of said side gears and second and third points of meshing engagement with its paired combination gear;
   said second point of meshing engagement being located at a first distance "a" along said common axis from said first point of meshing engagement, said third point of meshing engagement being located at a second distance "b" in an opposite direction along said common axis from said first point of meshing engagement, and said first distance "a" being not larger than said second distance "b; "
   said first point of meshing engagement being arranged for transmitting a first radial load "$W_{r1}$" that includes a component "$W_{s1}$" along a line of centers between said common axis and the respective axis of said one combination gear;
   said second and third points of meshing engagement being arranged for transmitting a combined second radial load "$W_{r2}$" that includes a component "$W_{s2}$" in an opposite direction along said line of centers; and said components "$W_{s1}$" and "$W_{s2}$" of the first and second radial loads being related by the following inequality:

$$2a\, W_{s1} \geq (a+b)W_{s2}$$

2. The differential assembly of claim 1 in which said component "$W_{s1}$" of the first radial load is determined in accordance with the following relationship:

$$W_{s1} = W_{r1}\, SIN(phi_{t1})$$

where "$phi_{t1}$" is a transverse pressure angle of mating gear tooth surfaces at said first point of meshing engagement.

3. The differential assembly of claim 2 in which said component "$W_{s2}$" of the second radial load is determined in accordance with the following relationship:

$$W_{s2} = W_{r2}\, COS(phi_{t2} + theta)$$

where "$phi_{t2}$" is an average transverse pressure angle of mating gear tooth surfaces at said second and third points of meshing engagement, and "theta" is an angle formed between said line of centers and a radial line connecting said common axis to said second and third points of meshing engagement projected into a transverse plane that extends normal to said common axis.

4. The differential assembly of claim 3 in which a transverse pressure angle "$phi_t$" is an average of the two transverse pressure angles "$phi_{t1}$" and "$phi_{t2}$" and is related to the angle "theta" according to the following inequality:

$$TAN(phi_t) \geq \frac{COS(theta)}{1 + SIN(theta)}$$

5. The differential assembly of claim 4 in which the transverse pressure angle "$phi_t$" is further related to the angle "theta" according to the following inequality:

$$TAN(phi_t) \geq \frac{COS(theta)}{\frac{2a}{(a+b)} + SIN(theta)}$$

6. The differential assembly of claim 1 in which each of said combination gears includes two gear sections separated by a stem section, and said component "$W_{s1}$" of the first radial load is of sufficient magnitude to urge both of said gear sections of said one combination gear into respective frictional engagements with one of said pockets.

7. The differential assembly of claim 6 in which said component "$W_{s1}$" of the first radial load is of sufficient magnitude to prevent said one combination gear from tipping within its pocket about an axis that extends perpendicular to both said line of centers and said common axis.

8. A parallel-axis gear differential comprising:
a housing rotatable by drive torque about a common axis of a pair of output shafts;
a pair of side gears positioned within said housing and adapted to receive respective ends of said output shafts for rotation therewith about said common axis;
at least one pair of combination gears positioned within said housing for rotation about respective axes that extend parallel to said common axis;
one of said combination gears having a first point of meshing engagement with one of said side gears and second and third points of meshing engagement with its paired combination gear;
a line of centers extending through both said common axis and the axis of said one combination gear in a transverse plane normal to said common axis;
a radial line extending through both said common axis and at least one of said second and third points of meshing engagement of said one combination gear projected into said transverse plane;
an angle "theta" formed between said line of centers and said radial line; and
an average transverse pressure angle "$phi_t$" between mating gear tooth surfaces at said three points of meshing engagement being determined in accordance with the following inequality:

$$TAN(phi_t) \geq \frac{COS(theta)}{1 + SIN(theta)}$$

9. The differential of claim 8 in which said one side gear has a first pitch radius "$r_1$", said one combination gear has a second pitch radius "$r_2$", and said angle "theta" is related to said first and second pitch radii "$r_1$" and "$r_2$" as follows:

$$SIN(theta) = \frac{r_2}{r_1 + r_2}$$

10. The differential of claim 9 in which said second point of meshing engagement is located at a first distance "a" along said common axis from said first point of meshing engagement, said third point of meshing engagement is located at a second distance "b" in an opposite direction along said common axis from said first point of meshing engagement, and said first distance "a" is smaller than said second distance "b".

11. The differential of claim 10 in which said transverse pressure angle "$phi_t$" is further limited by the following inequality:

$$TAN(phi_t) \geq \frac{COS(theta)}{\frac{2a}{(a+b)} + SIN(theta)}$$

12. The differential of claim 8 in which a first radial load "$W_{r1}$" transmitted by said first point of meshing engagement includes a component "$W_{s1}$" along said line of centers and a combined second radial load "$W_{r2}$" transmitted by said second and third points of meshing engagement includes a component "$W_{s2}$" in an opposite direction along said line of centers.

13. The differential of claim 12 in which said component "$W_{s1}$" of the first radial load is determined in accordance with the following relationship:

$$W_{s1} = W_{r1}\, SIN(phi_t)$$

14. The differential of claim 13 in which said component "$W_{s2}$" of the combined second radial load is determined in accordance with the following relationship:

$$W_{s2} = W_{r2}\, COS(phi_t + theta)$$

15. The differential of claim 14 in which said component "$W_{s1}$" of the first radial load applies a first moment "$M_a$" at said second point of engagement as follows:

$$M_a = a\, W_{s1}$$

16. The differential of claim 15 in which said component "$W_{s2}$" of the combined second radial load applies a second oppositely directed moment "$M_{ab}$" at said second point of engagement as follows:

$$M_{ab} = \frac{(a + b)\, W_{s2}}{2}$$

17. The differential of claim 16 in which said first moment "$M_a$" is larger than said second moment "$M_{ab}$".

* * * * *